United States Patent [19]
Anderson

[11] 3,938,829
[45] Feb. 17, 1976

[54] BOAT TRAILER LATCHING DEVICE

[76] Inventor: James D. Anderson, 4339 S. 850 East, South Ogden, Utah 84403

[22] Filed: Oct. 21, 1974

[21] Appl. No.: 516,277

[52] U.S. Cl. ............................................. 280/414 R
[51] Int. Cl.² ............................................. B60P 3/10
[58] Field of Search......... 280/414 R; 214/505, 506, 214/84; 9/1 T

[56] References Cited
UNITED STATES PATENTS

| | | | |
|---|---|---|---|
| 2,763,384 | 9/1956 | Foster | 214/84 |
| 2,765,942 | 10/1956 | Niemeier | 214/506 |
| 2,858,951 | 11/1958 | Cabluck | 214/505 |
| 3,140,003 | 7/1964 | Horner | 214/505 |
| 3,750,805 | 8/1973 | Finney | 214/84 |

Primary Examiner—M. Henson Wood, Jr.
Assistant Examiner—John A. Pekar
Attorney, Agent, or Firm—Richard F. Bojanowski

[57] ABSTRACT

A boat latching device is disclosed for use on boat trailers. The latching device includes an elongated support member and a bow conforming guide member having a spring-loaded latching mechanism mounted thereto. An adjustable or resiliently mounted bow stop member is attached at or near the top of the support member. The entire latching device is mounted at the forward end of a boat trailer so that it can receive and hold an elongated eye fixed to the bow of a boat.

13 Claims, 10 Drawing Figures

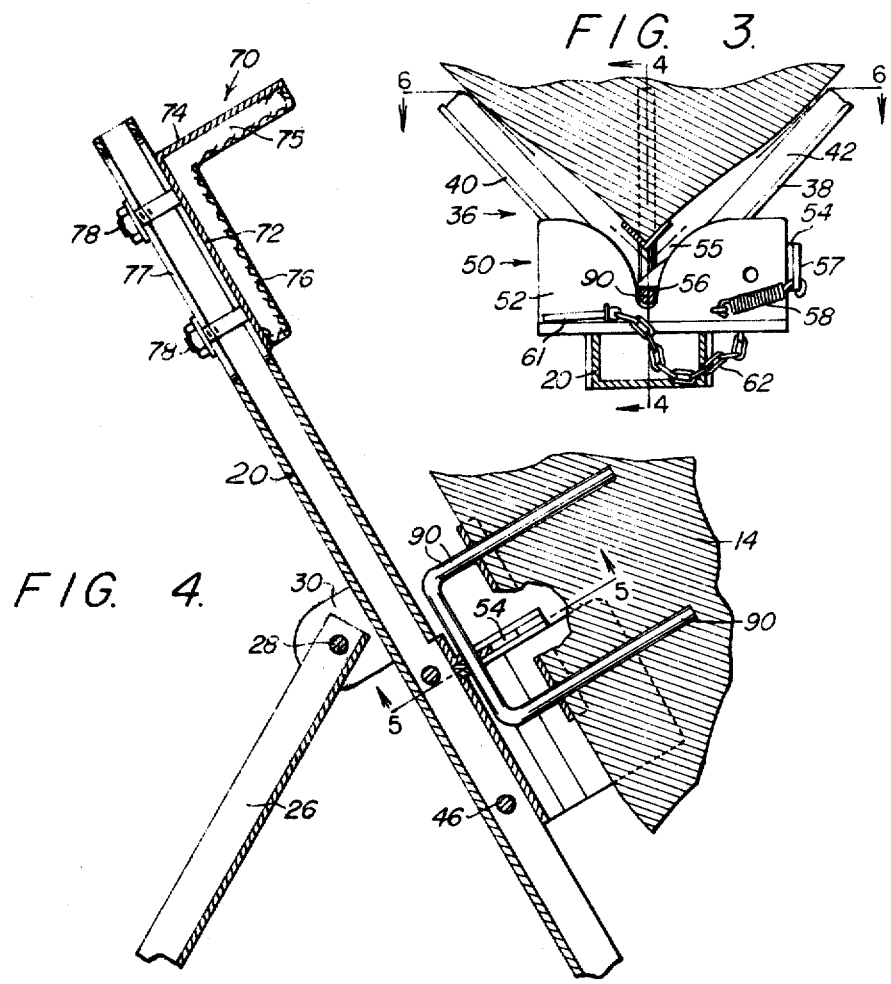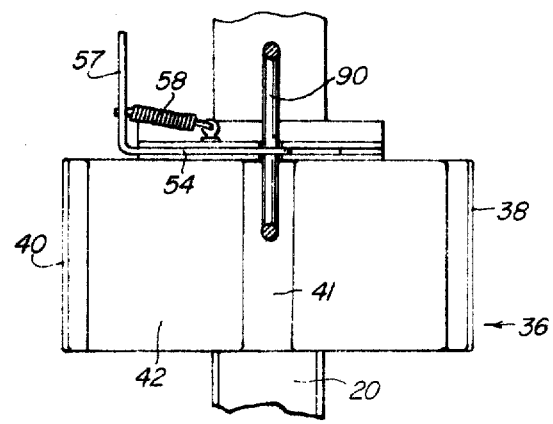

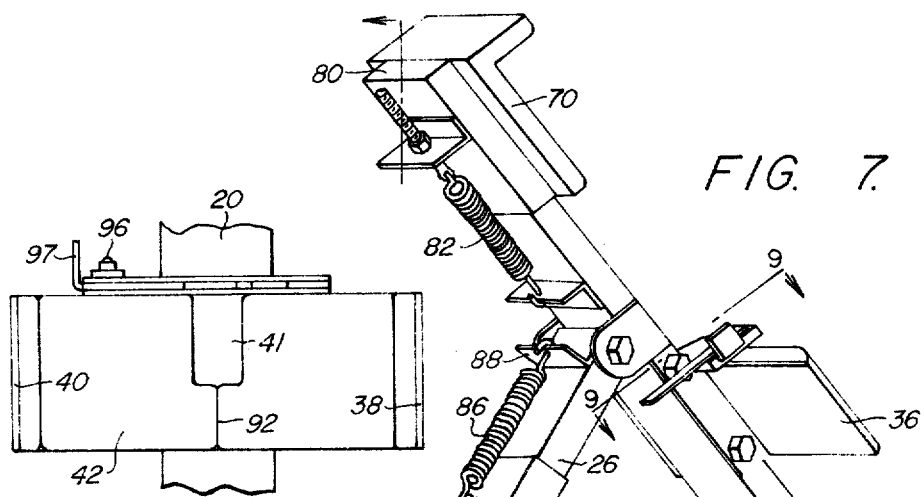
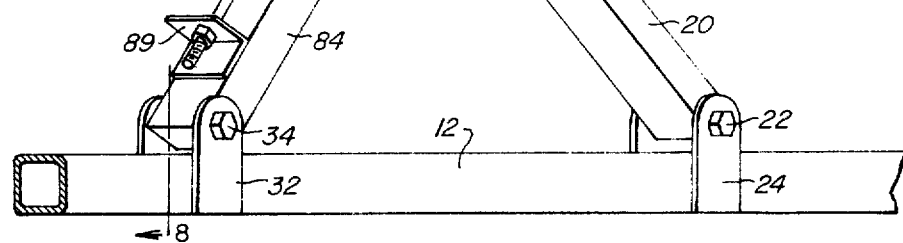
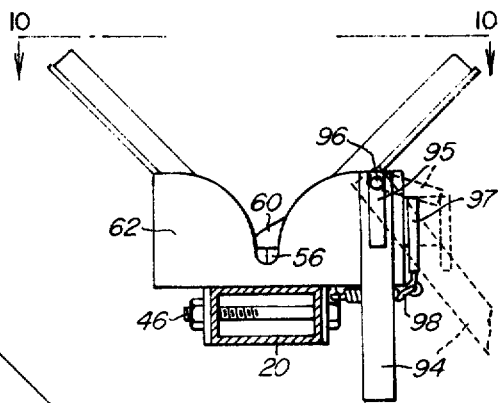
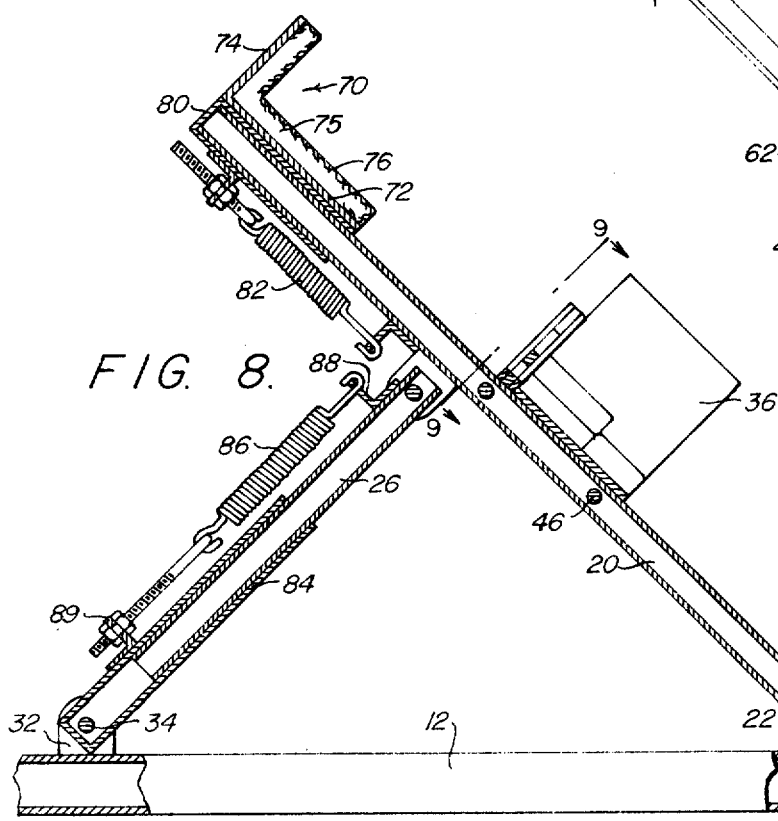

3,938,829

BOAT TRAILER LATCHING DEVICE

BACKGROUND OF THE INVENTION

1. Field

This invention is directed to a latching device and particularly to an automatic boat latching device which is adapted for use on boat trailers.

2. State of the Art

The use of trailers for transporting, launching or retrieving pleasure boats are widely used by the boating public. Most commercially available boat trailers utilize a combination of a winch and tow rope for retrieving boats from the water onto a boat trailer. One major disadvantage inherent in the use of a winch and tow rope is that at least two people are required to effectively retrieve and load the boat. One person is normally needed to connect the towline to the boat and operate the winch. The other person is required to navigate and maintain the boat in alignment with the boat trailer. In rough or turbulent waters the alignment of the boat with the trailer, as well as the attachment of the towline to the boat, becomes an extremely difficult and precarious task.

OBJECTS OF THE INVENTION

To avoid the above shortcomings, it is an object of this invention to provide a boat trailer latching device which is simple in mechanical construction and operation. Another object of this invention is to provide a boat latching mechanism which requires the use of only one person, even when the retrieval is attempted under adverse conditions. Still another object of this invention is to provide a boat latching mechanism which does not require the use of a winch and tow rope. Still another object of this invention is to provide a boat trailer latching device which facilitates alignment of the boat with the latching mechanism and permits automatic latching of the boat on the trailer. Other objects and advantages of this invention will be more apparent from the description which subsequently follows.

PRIOR ART

Relevant prior art relating to the trailer latching device of this invention includes the following U.S. Pat. Nos. 3,224,019; 3,295,864; 3,303,951; and 3,632,138.

SUMMARY OF THE INVENTION

The boat and trailer latching device of this invention comprises generally a bow conforming guide member having a mouth and throat section and a latching means affixed in a plane proximal to the throat section of the bow conforming guide member. Preferably the latching device is mounted to an upstanding support member, having a bow stop member adjustably and/or resiliently attached to the forward end thereof. More specifically, the upstanding support member is designed to be fixed to the forward end of a boat trailer so that the bow of a boat, having an elongated eyelet vertically affixed thereto, can enter the mouth of the bow conforming guide member and automatically connect the eyelet with the latching device. The latching means includes a latch housing or enclosure, having a curved, "V" shaped opening providing a mouth and throat section similar to that of the bow conforming guide member. A spring-loaded slideable locking bar is actuatably contained within the latch housing and traverses the throat section of the latch housing. When a forward force is exerted upon the locking bar, such as that generated by contact of an elongated eyelet mounted to the bow of a forward moving boat, the locking bar overcomes the spring tension and is slideably forced into the latch housing. The elongated eyelet passes beyond the locking bar and into an interior space located deep in the latch housing's throat section, permitting the spring-loaded locking bar to return to its normally extended position. With the locking bar in its extended position, the elongated eyelet is retained within the interior space until such time that the locking bar is retracted into the housing and thereby releasing the eyelet. With the eyelet in a locked position, the boat is held firmly in position against the upright member and may be transported on the boat trailer without fear of an inadvertent release.

BRIEF DESCRIPTION OF THE DRAWINGS

FIG. 3 is a top view of the latching device of this invention taken along line 3—3 of FIG. 2.

FIG. 4 is a side cross sectional view of the latching device of this invention taken along line 4—4 of FIG. 3.

FIG. 5 is a front cross sectional view of the latching device of this invention taken along line 5—5 of FIG. 4.

FIG. 6 is a front sectional view of the latching device of this invention taken along lines 6—6 of FIG. 3.

FIG. 7 is an isometric view of another embodiment of the device of this invention.

FIG. 8 is a side cross sectional view of the device shown in FIG. 7.

FIG. 9 is a front elevation of the device shown in FIG. 8 taken along line 9—9.

FIG. 10 is a top view of the device shown in FIG. 9 taken along line 10—10.

DESCRIPTION OF THE PREFERRED EMBODIMENT

Figure 1:
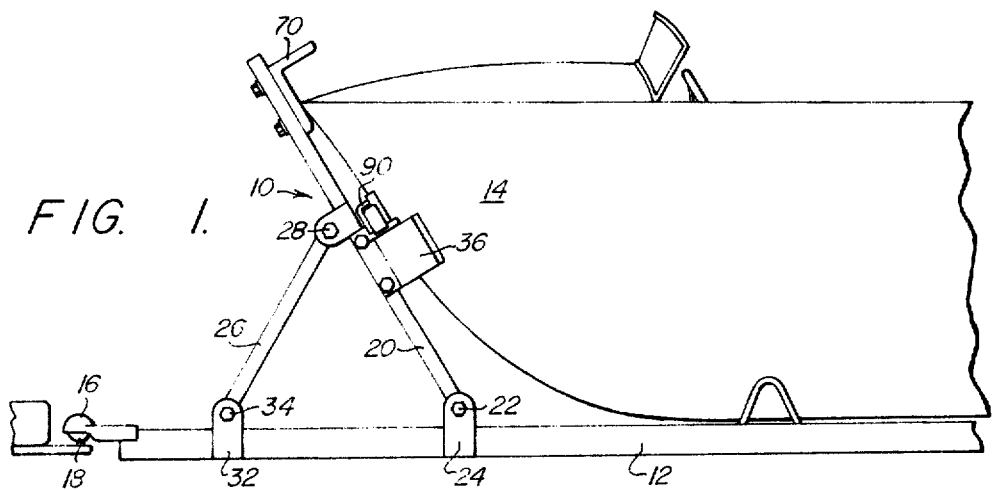
FIG. 1 is a side elevation of the latching device of this invention operationally mounted to a boat trailer. The bow of a boat is also shown connected to the latching device.
Figure 2:
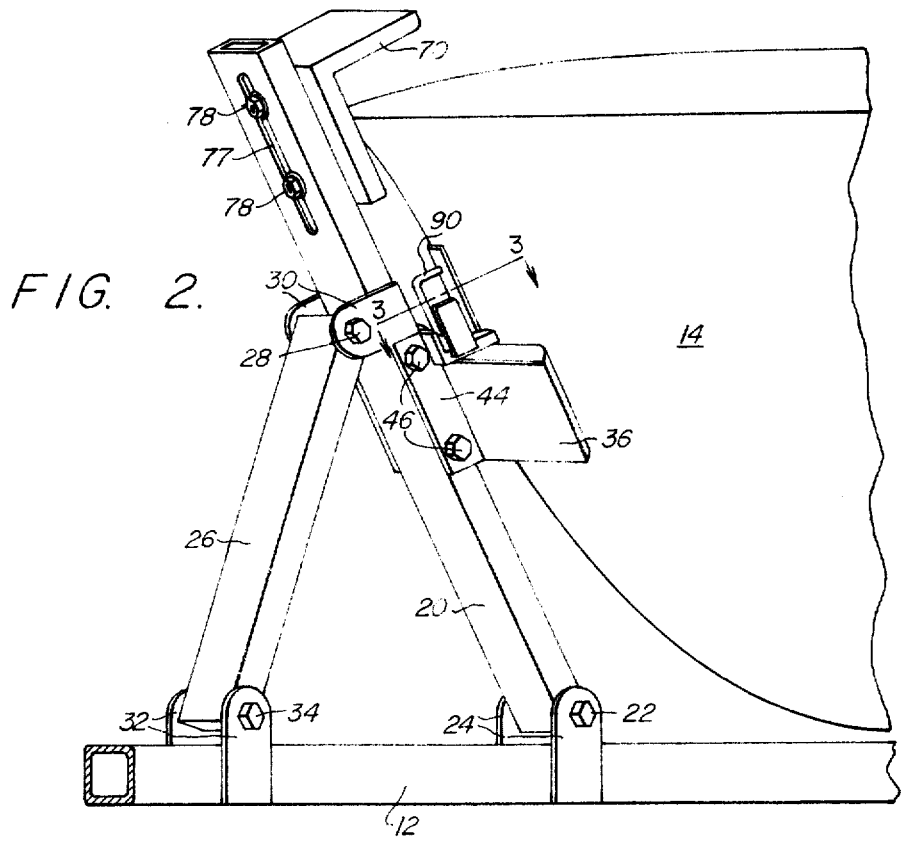
FIG. 2 is an enlarged isometric view of the front section of the device shown in FIG. 1.

As shown in FIGS. 1 and 2, the latching device of this invention, shown generally by the numeral 10, is pivotally mounted at its base section to a horizontal frame member 12 of a wheeled boat trailer (not shown). The bow of a partially shown boat, identified generally by the numeral 14, is carried on the trailer with its bow connected to the latching device 10 by means of an elongated eyelet 90 vertically fixed thereto. The trailer is connected to a vehicle by means of a captive cap 16 and ball 18, which in combination forms the vehicle-trailer connecting mechanism.

The latching device 10 has an upwardly slanted elongated support member 20, pivotally mounted at its base to a pair of upward extending extensions 24 welded to the horizontal frame member 12 of the boat trailer by means of a traversing threaded bolt or pin and nut arrangement 22. A downward extending support brace 26 is pivotally mounted at its upper end to a pair of extensions 30, extending forwardly from about the center of the upwardly slanted elongated support member 20. The pivotal connection is provided by means of a threaded pin and bolt 28. The lower end of the downward extending support brace 26 is pivotally attached to a pair of upward extending extensions 32 welded to the horizontal frame member 12 by means of a third threaded pin and nut arrangement 34.

As is more clearly shown in FIGS. 3 - 6, the latching device of this invention includes a bow conforming guide member 36 constructed from a pair of metal plates 38 and 40, welded at an angle of between about 90° and 140°. To accommodate most pleasure boats, an angle of about 125° is for the most part satisfactory. A nonmetallic, relatively soft material such as wood or plastic (not visible) is attached to the plates' inner face by gluing, recessed screws, or the like. The dimensions of the nonmetallic material are such that an open central area 41 is provided (See FIG. 6). The nonmetallic pieces are then covered with a mar protective material 42 such as carpeting, plastic and the like. A pair of winged members 44 extend outwardly from or near the apex of the angled plates for attachment to the upward extending elongated support member 20 by means of bolts and nuts 46 or other removable securing means. Mounted at or near the top of the bow conforming guide member 36 is a latching device shown generally by the numeral 50. (See FIGS. 3 and 5.) The latching device 50 comprises a latch housing 52, having a rounded or curved "V" shaped opening 53. The "V" shaped opening is characterized by having a forward or mouth section 55 and a rear or throat section 56. A biased locking bar 54 is slideably carried within the latch housing 52 so that its leading curved end traverses the throat section of the latch housing. The locking bar is continually urged to an extended position across the throat section 56 of the latching device by means of a fixed biasing means such as a coiled spring 58 attached at one end to the handle 57 of the locking bar 54 and at the other end to the latch housing 52. As earlier indicated, the locking bar is preferably rounded or curved along its leading edge 60 to facilitate its slideable movement into the latch housing whenever a forward force is perpendicularly exerted thereon. The locking bar can be retained in its retracted position by means of a pawl or a pin 61 and chain 62 arrangement as shown in FIG. 3. This is accomplished by inserting the pin 61 through a pair of registerable openings 64 and 66 drilled through both the housing and the locking bar respectively. Registry of the openings 64 and 66 is achieved by the slideable movement of the locking bar.

Although a slideable spring-loaded bar is depicted as the preferred embodiment, the locking bar can, with minor variations of the housing member, be pivotally mounted therein. In such an embodiment the pivotal locking bar would be biased to a normally closed position; that is, the locking bar would be continually urged to traverse the throat section of the latch housing. An extended handle member would be connected to the locking bar and would extend beyond the latch housing for manual operation. Whenever a force is exerted on the locking bar, it would pivotally move about its pivotal point, permitting the elongated, vertically mounted eyelet to enter into the deep interior space of the latch housing's throat section.

An inverted L shaped bow stop member 70 is adjustably mounted at or near the top of the upwardly slanted elongated support member. As depicted in the drawings, the bow stop member is constructed from a vertical 72 and horizontal metal plate 74 welded perpendicularly to each other at or near its ends to form an inverted L. A nonmetallic material 75, such as wood or plastic, is cut to conform to the dimensions of the metal plate 72 and 74 and secured thereto. The nonmetallic material is then covered with a non-marring covering material, such as carpeting 76. The stop member is secured for adjustable movement to the upwardly slanted elongated support member 20 by bolts and nuts 78 fixed to the stop member and passing through an elongated slot 77 cut in the upwardly slanted support member 20. In lieu of nuts and bolts, the stop member can be mounted on a biased sleeve overriding the upwardly slanted support member 20 to permit slideable movement thereon. This embodiment will be subsequently described in more detail.

For connecting a boat to the latching device, an elongated U-shaped eyelet 90 is vertically fixed to the bow of a boat 14. The eyelet 90 is connected to the latching device by the forward movement of the boat, forcing the eyelet against the rounded leading edge 60 of the locking bar 54. The force exerted by the eyelet is horizontally transferred to the locking bar, urging the locking bar into the housing until such time that the eyelet passes therebeyond and enters into the interior space contained deep in the throat of the latching device. As the eyelet moves into the interior opening, the locking bar is returned to its closed position by the tension of the extended spring 58, trapping the elongated eyelet 90 in the interior opening. The eyelet is released from the interior opening by the manual movement of the locking bar which withdraws the locking bar 54 from across the throat section of the locking device and into the housing member. The locking bar may then be retained in its open position by means of the pin 61 and chain 62 arrangement previously described.

Referring now to FIGS. 7 - 10, the embodiment shown is essentially identical to that shown in FIGS. 1 - 6. Since the latching device shown includes elements common to both embodiments, only a cursory explanation shall be given to the like elements. The embodiment shown includes an upwardly slanted elongated support member 20 and its accompanying downward extending support brace 26. A bow conforming guide member 36 is attached to the upwardly slanted elongated member in the manner earlier described.

The major differences between the embodiment shown in FIGS. 7 - 10 and that earlier described are that the stop member 70 is mounted to a slideable sleeve 80 biased downwardly by an adjustably mounted coiled spring 82. The slideable sleeve telescopically engages the top end of the upwardly slanted support member 20. The lower portion of the downward extending brace is pivotally mounted to the horizontal frame by means of a second sleeve 84 biased upwardly by means of a heavy duty coiled spring 86 adjustably mounted to extensions 88 and 89 welded to the sleeve 84 and the brace 26, respectively.

The latter biased sleeve arrangement permits the boat trailer to "bend" as the towed trailer passes over rises and depressions normally found on unimproved roadways. The use of a biased sleeve is particularly advantageous if the trailer possesses tandem wheels.

The use of a biased sleeve 80 for holding the bow stop member 70 in position is advantageous for preventing the bow of the boat to abruptly contact the bow stop member when it is deflected upwardly during the connecting operation. This shock absorbing arrangement permits the boat to be driven against the latching device at a relatively high speed without causing damage to the latching device or to the boat.

Another feature which distinguishes this embodiment from that earlier described is that the bow conforming guide member 36 contains a bow deflecting connecting member 92 located at the base of the throat section of the bow conforming guide member 36. This bow deflecting member transfers most all of the forward force of the boat upward and thereby reduces the force exerted against the latch device during the connecting operation. The bow deflecting member is sufficiently recessed so that when the eyelet is in contact therewith it can still make connection with the latching device. In comparing FIG. 6 with FIG. 10, it can be seen that a portion of the open area 41 is filled with an extension of the nonmetallic covering 92.

The locking bar 54 and it's curved leading edge 60 extends across the throat 56 of the latch housing 52. To facilitate slideable movement of the locking bar, a leverage arm 94 is pivotally mounted to the latch housing by means of a pin 96. The locking bar 54 contains a perpendicularly welded stop member 97 against which the leverage arm 94 is urged to cause slideable movement. The sliding bar is continually urged across the throat of the latch housing by means of a coiled spring 98. As shown in phantom, the locking bar may be held in its open position by partial rotation of the pivoted pawl 95 and placement of the pawl against the stop member 97. The pawl is pivoted about pin 96 as is the leverage arm 94.

In retrieving a boat from the water, the empty boat trailer is backed down a boat ramp and into the water by means of a vehicle attached thereto. The boat is then aligned with the latching device by positioning the bow in alignment with the stop member 12 positioned at the top of the upward extending elongated support member 20. After the boat has been properly aligned, the operator will move the boat forward against the latching device, forcing the eyelet 90 against the leading edge 60 of the locking bar 54. As the eyelet is forced against the locking bar, the locking bar is forced into the housing and the eyelet passes therebeyond into the interior space deep in the throat of the locking device. As the eyelet passes therethrough, the force of the boat entering thereon will be deflected upward and against the stop member positioned at or near the top of the upwardly slanted elongated support member 20. When the inertia of the boat has been negated, the boat will slide gracefully backward with its eyelet securely latched within the latching device. The vehicle carrying the trailer may then be moved forward, carrying both the trailer and boat out of the water.

The latching device of this invention facilitates the retrieval of pleasure boats from waters, even though the waters may be of a turbulent nature. The only requirement necessary for latching the boat to the trailer is the operator's ability to navigate the boat in alignment with the latching device and driving it forward with sufficient force to complete the connecting action.

While the invention has been described with reference to certain specific embodiments, it is understood that changes may be made by one skilled in the art and it would not thereby depart from the spirit and scope of the invention which is to be limited only by the claims appended hereto.

I claim:

1. A boat latching device comprising an upstanding support member, a bow stop member slidably biased to the upper end of said upstanding support member, a bow conforming guide member fixed to said upstanding support member below said stop member and a means for automatically latching the bow of a boat to said upstanding support member.

2. The boat latching device of claim 1 wherein the means for automatically latching the bow of said boat is carried at or near the top of said bow conforming guide member.

3. The latching device of claim 1 wherein said latching means comprises a latch housing having a rounded "V" shaped opening and a biased locking bar traversing said rounded "V" shaped opening.

4. The latching device of claim 3 wherein said locking bar is carried for slideable movement within said housing and is adapted with a means for holding said locking bar in a retracted position.

5. The device of claim 4 wherein said bow stop member is adjustably attached to said upstanding support member.

6. The latching device of claim 1 wherein said bow stop and bow conforming guide members are padded.

7. The latching device of claim 1 wherein said upstanding support member includes a pivotally mounted brace member.

8. The latching device of claim 7 wherein said pivotally mounted brace member is extendable.

9. In combination with a boat and trailer wherein said boat includes an elongated eye member vertically secured to the bow of said boat and said trailer includes an upstanding support member mounted at the forward end thereof, a bow stop member slidably biased to said upstanding support member, a bow conforming guide member mounted to said upstanding support member below said bow stop member and a latching means for receiving and holding said elongated eye member, whenever said elongated eye member is urged against said latching means.

10. A latching device for attachment to an upstanding support member mounted to a boat trailer comprising a bow conforming guide member, having a mouth and throat section and a latching means mounted in proximity to said throat section, said latching means including a latch housing having a rounded "V" shaped opening, a biased locking bar slideably carried within said housing for traversing said "V" shaped opening and a means for holding said biased locking bar in a retracted position.

11. The latching device of claim 10 wherein said biased locking bar contains a rounded leading edge and wherein said means for holding said biased locking bar in a retracted position comprises in combination a pivotally mounted pawl and an operatively associated stop member.

12. A boat latching device comprising an upstanding support member, a bow stop member mounted to the upper end of said upstanding support member, a bow conforming guide member fixed to said upstanding support member below said stop member and a latching means for latching the bow of a boat to said upstanding support member, said latching means being fixed to said upstanding support member intermediate to said bow stop member and said bow conforming member.

13. The boat latching device of claim 12 wherein said latching means is adapted to receive an elongated eye vertically fixed to the bow of a boat.

* * * * *